(12) United States Patent
Ruiz et al.

(10) Patent No.: US 8,797,671 B2
(45) Date of Patent: Aug. 5, 2014

(54) EXCITATION OF AIRBEARING OSCILLATION WITH TAR NEARFIELD DEVICE FOR TOUCHDOWN DETECTION

(75) Inventors: Oscar J. Ruiz, San Jose, CA (US);
Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 19 days.

(21) Appl. No.: 13/474,593

(22) Filed: May 17, 2012

(65) Prior Publication Data

US 2013/0308223 A1 Nov. 21, 2013

(51) Int. Cl.
*G11B 21/02* (2006.01)
*G11B 27/36* (2006.01)
*G11B 5/127* (2006.01)

(52) U.S. Cl.
USPC ............................ 360/75; 360/31; 360/125.31

(58) Field of Classification Search
None
See application file for complete search history.

(56) References Cited

U.S. PATENT DOCUMENTS

| | | | |
|---|---|---|---|
| 7,292,401 B2 | 11/2007 | Shen et al. | |
| 7,542,228 B2 * | 6/2009 | Knigge et al. | ................. 360/75 |
| 7,692,888 B2 | 4/2010 | Duan et al. | |
| 7,724,462 B2 | 5/2010 | Duan et al. | |
| 7,808,734 B2 | 10/2010 | Eaton et al. | |
| 7,990,647 B2 | 8/2011 | Lille | |
| 7,995,425 B2 | 8/2011 | Schreck et al. | |
| 2010/0259850 A1 | 10/2010 | Miyake et al. | |
| 2011/0007621 A1 | 1/2011 | Park et al. | |
| 2013/0141818 A1* | 6/2013 | Sinclair et al. | ................ 360/110 |

FOREIGN PATENT DOCUMENTS

| | | |
|---|---|---|
| JP | 2163605 A | 6/1990 |
| JP | 2003/308670 A | 10/2003 |
| JP | 2009/151890 | 7/2009 |
| JP | 2010/250900 A | 11/2010 |

OTHER PUBLICATIONS

Park et al., "Investigation of the Dynamic Characteristics of Light Delivery for Thermal Assisted Magnetic Recording," 2011 IEEE, IEEE Transactions on Magnetics, vol. 47, No. 7, Jul. 2011, pp. 1992-1998.
Li et al., "Thermally Induced Stability Issues of Head-Disk Interface in Heat-Assisted Magnetic Recording System," 2005 The Japan Society of Applied Physics, Japanese Journal of Applied Physics, vol. 44, No. 11, 2005, pp. 7950-7953.

* cited by examiner

*Primary Examiner* — Andrew L Sniezek
(74) *Attorney, Agent, or Firm* — Zilka-Kotab, PC

(57) ABSTRACT

In one general embodiment, a magnetic head includes a slider having a media-facing surface; and a device coupled to the slider and being selectively extendible for selectively contacting a magnetic medium at a frequency of between about 200 and about 600 kHz. Other magnetic heads and methods of use are described according to additional embodiments.

15 Claims, 6 Drawing Sheets

EXCITATION OF AIRBEARING OSCILLATION WITH TAR NEARFIELD DEVICE FOR TOUCHDOWN DETECTION

FIELD OF THE INVENTION

The present invention relates to data storage systems, and more particularly, this invention relates to using forced excitation of media bearing surface frequencies as a touchdown indicator.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ability for the slider to ride on an air bearing at a slight distance while functioning as a writer/reader serves as a touchdown scheme. Although undesirable, currently there are several embodiments of touchdown schemes used depending on various situational parameters. Ideally, an individual touchdown scheme would be applicable in all instances, but has not been achieved. The further universalization of touchdown schemes has proven to be difficult so far.

SUMMARY

In one general embodiment, a magnetic head includes a slider having a media-facing surface; and a device coupled to the slider and being selectively extendible for selectively contacting a magnetic medium at a frequency of between about 200 and about 600 kHz.

In another general embodiment, a magnetic data storage system includes a slider having a media-facing surface; a magnetic medium; a device coupled to the slider and being selectively extendible for selectively contacting the magnetic medium for inducing an oscillation in a flying height of the slider relative to the medium; a drive mechanism for passing the magnetic medium over the at least one slider; and a controller electrically coupled to the device for controlling operation of the device.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems and/or related systems and methods, as well as operation and/or component parts thereof.

In one general embodiment, a magnetic head includes a slider having a media-facing surface; and a device coupled to the slider and being selectively extendible for selectively contacting a magnetic medium at a frequency of between about 200 and about 600 kHz.

In another general embodiment, a magnetic data storage system includes a slider having a media-facing surface; a magnetic medium; a device coupled to the slider and being selectively extendible for selectively contacting the magnetic medium for inducing an oscillation in a flying height of the slider relative to the medium; a drive mechanism for passing the magnetic medium over the at least one slider; and a controller electrically coupled to the device for controlling operation of the device.

Figure 1:
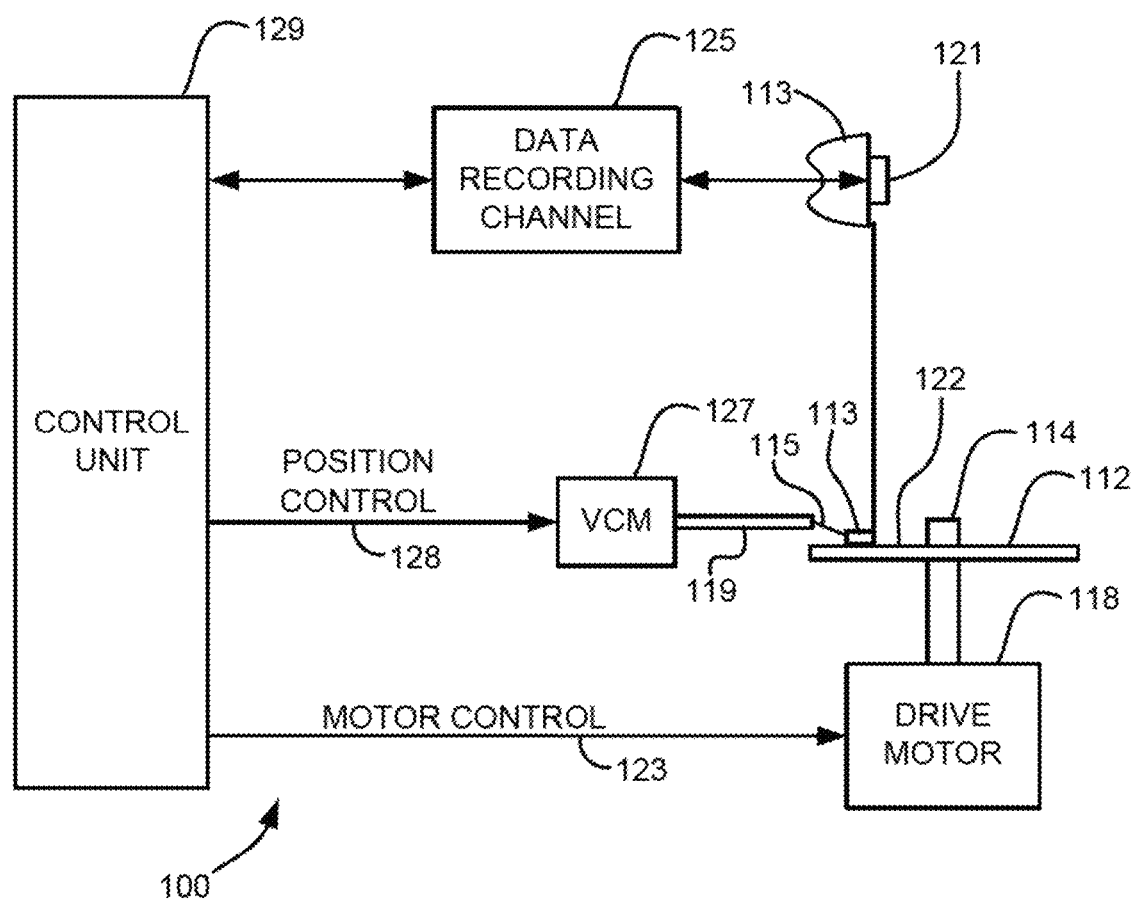
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit (controller) 129, such as access control signals and internal clock signals. Typically, control unit 129 includes logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
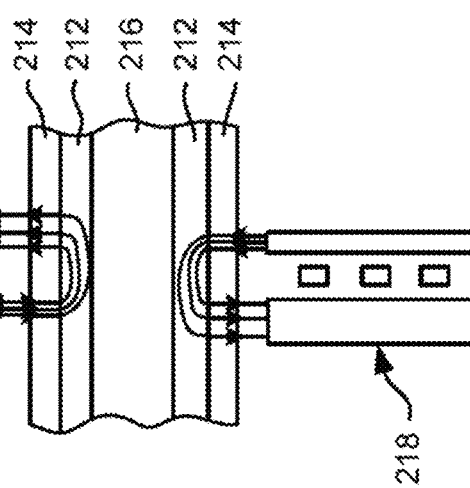
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, includes basically a supporting substrate 200 of a suitable non-magnetic material such as glass, with an overlying coating 202 of a suitable and conventional magnetic layer.

Figure 2B:
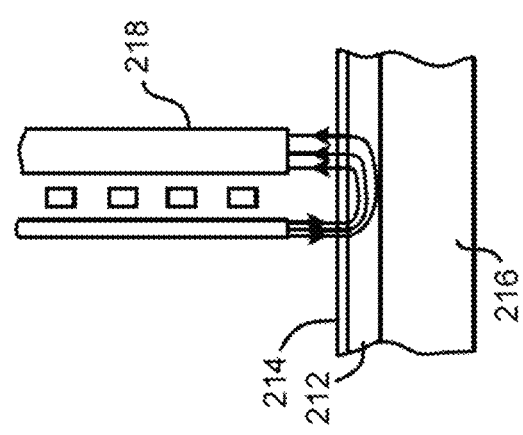
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
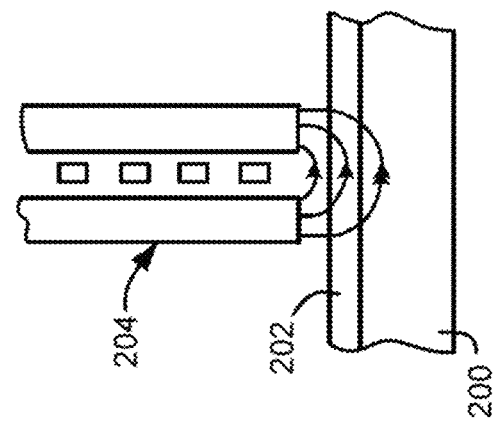
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
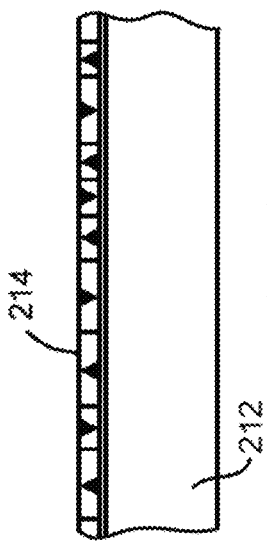
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
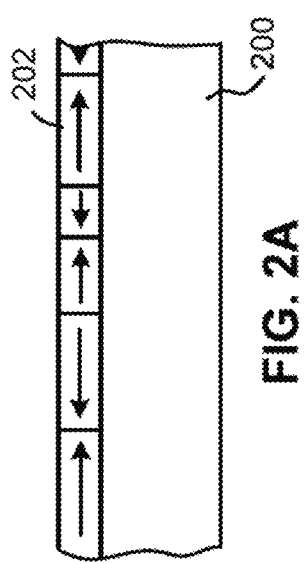
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
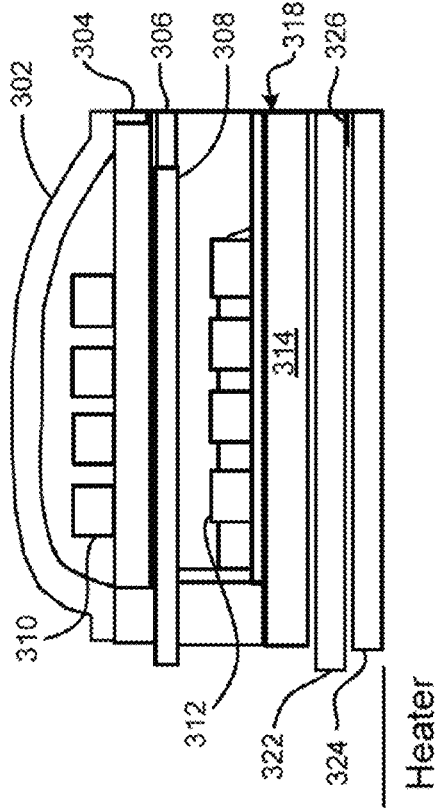
FIG. 3B is a cross-sectional view of one particular embodiment of a piggyback magnetic head with helical coils.
Figure 3A:
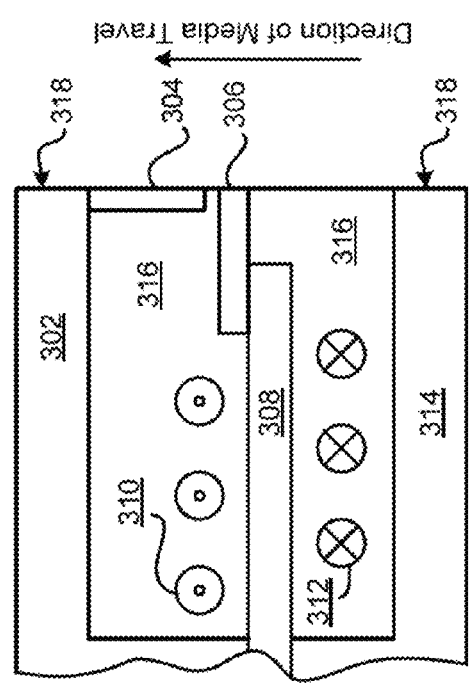
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
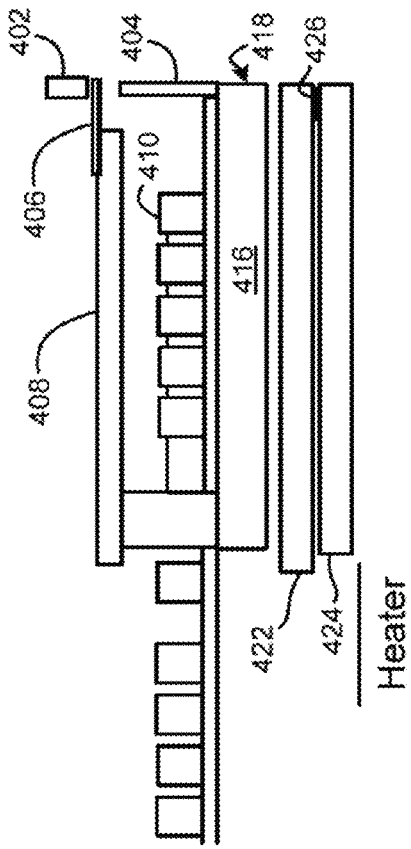
FIG. 4B is a cross-sectional view of one particular embodiment of a piggyback magnetic head with looped coils.
Figure 4A:
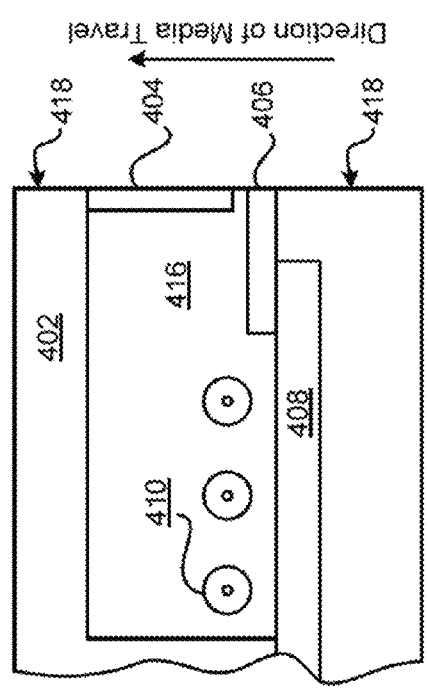
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

The embodiments described herein add a universal aspect to the touchdown scheme by using forced excitations as touchdown indicators. These embodiments are most preferably conducted with the advent of TAR nearfield devices, and/or other devices with very short protrusion time constants.

Magnetic data storage systems in some embodiments are not limited to disk storage. The magnetic data storage systems may include a magnetic head and a magnetic medium. In various approaches, the magnetic medium may include a magnetic tape, a magnetic disk, etc. or any other magnetic medium which would be apparent to one skilled in the art upon reading the present description. In another approach, the data storage system may include at least one magnetic head, at least two magnetic heads, etc.

Figure 5:
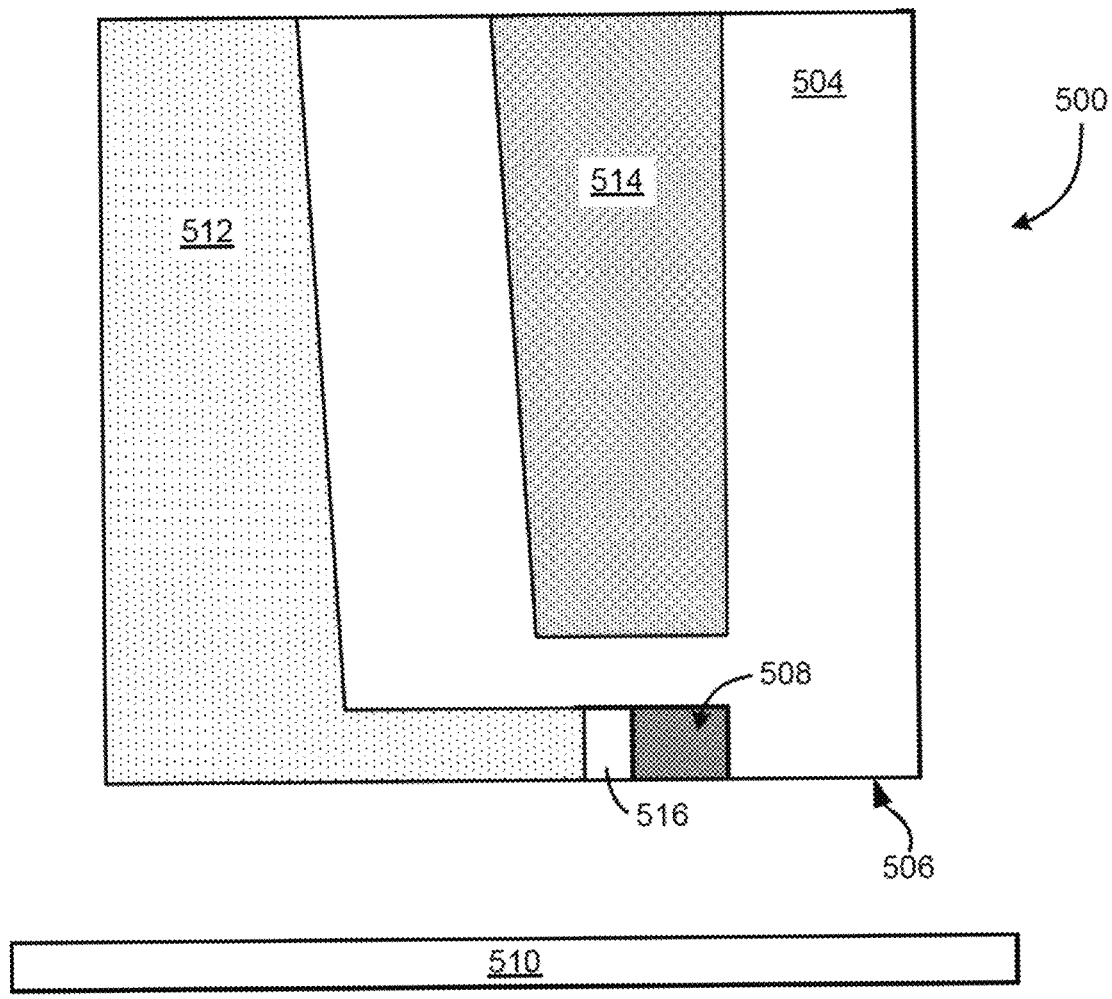
FIG. 5 is a partial cross-sectional view of a magnetic data storage system according to one embodiment.

FIG. 5 depicts a magnetic head 500 in accordance with one embodiment. As an option, the present magnetic head 500 may be implemented in conjunction with features from any other embodiment listed herein, such as those described with reference to the other FIGS. Of course, however, such magnetic head 500 and others presented herein may be used in various applications and/or in permutations which may or may not be specifically described in the illustrative embodiments listed herein. Further, the magnetic head 500 presented herein may be used in any desired environment.

According to one embodiment, as shown in FIG. 5, the magnetic head 500 preferably includes a device 508 coupled to the slider 504. In one approach, the device 508 may include a near field transducer (NFT) such as a plasmon antenna, NFT antenna, etc. In various approaches, the device 508 may be heated with a heater, a laser, joule heating, etc., to induce thermal protrusion (see FIG. 6). According to a general approach having an NFT, as shown in FIG. 5, the magnetic head 500 may additionally include a magnetic pole 512 and a waveguide core 514. In a further approach, a dielectric layer 516 may separate the magnetic pole 512 and the device 508.

Figure 6:
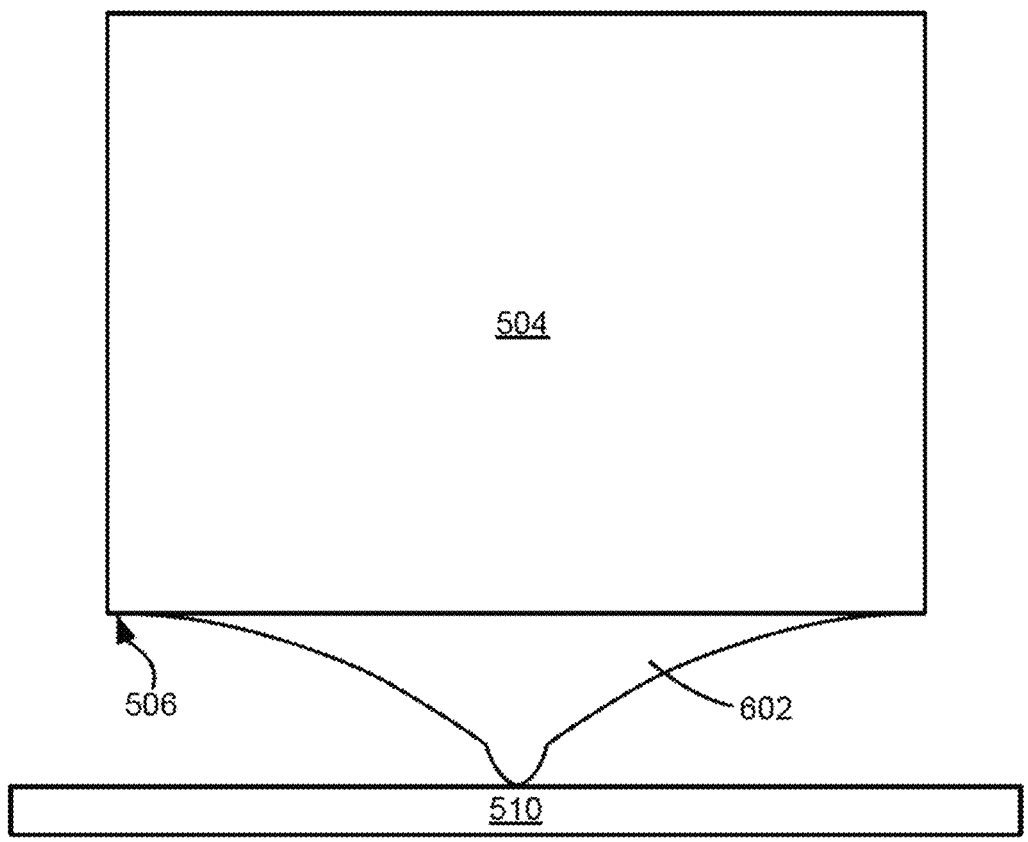
FIG. 6 is a partial rear view of a magnetic data storage system according to one embodiment.

As depicted in the backside view of the slider 504 in FIG. 6, in a preferred approach, the thermal protrusion 602 may be of the media-facing surface 506 in the vicinity of the aforementioned device 508.

In one approach, the device 508 may be selectively moved towards and away from the magnetic medium 510 by controlling a thermal protrusion induced by the device 508 when heated. According to another approach, the device may expand and contract at the frequency upon which it is being repeatedly heated and cooled.

Moreover, the area undergoing the protrusion is preferably small enough that while undergoing expansion and contraction in the open air, very little, and more preferably no momentum caused by the protrusion is transferred to the magnetic head.

In one approach, the device 508 may be selectively extendible for selectively contacting the magnetic medium 510 at a frequency of between about 200 kHz and about 600 kHz, but may be higher or lower based on the desired embodiment. In a preferred approach, the device 508 may be selectively extendable by incorporating thermal protrusion at the desired frequency, e.g., by heating and/or cooling at about the desired frequency.

In some embodiments, a heater such as a thermal fly-height control (TFC) heater is used to assist in effecting the selective contacting. In one approach, the TFC heater induces thermal protrusion of the media-facing surface in a vicinity of the device, the thermal protrusion moving the device towards the magnetic medium, thereby bringing the media-facing surface 506 close enough to the medium 510 for the device 508 to conduct the selective contacting.

In a preferred approach, the device 508 may be positioned towards a trailing edge of the slider 504 or another location where the device 508 may function as the mean fly point. This may allow the device 508 to be located where it can be the first part of the ABS to touch the magnetic medium when protrusion is induced. Positioning the device 508 in such a way thereby eliminates any effect of slider skew angle relative to data tracks thereunder. Moreover, such positioning allows the touchdown sensitivity to be independent of the skew angle (usually unachievable in conventional schemes) while also being independent of shifts to the contact position.

In another approach, the selective contacting at the aforementioned frequency may induce an oscillation in a flying height of the slider 504 relative to the medium 510. In one approach, the oscillation induced by the contacting may be at a frequency of between about 200 kHz and about 600 kHz, but may be higher or lower based on the desired embodiment.

The time constant for the protrusions is most preferably fast enough to be able to match the magnetic head's resonance frequency, which would not be achievable using conventional designs. In a preferred embodiment, the device 508 may have a time constant of thermal protrusion of less than about 0.8 microseconds, more preferably less than about 0.6 microseconds, still more preferably less than about 0.4 microseconds for a protrusion of about 1 nm long from a state at room temperature, e.g., 26° C., but could be more or less depending on the desired embodiment.

Each magnetic head may have a slightly different frequency at which it resonates, causing the ABS's position relative to the magnetic medium to vary at any given time. However, these slight shifts can easily be measured for each magnetic head incorporating various conditions like disk location, pressure, humidity, etc. by preferably incorporating TAR nearfield devices and their fast actuation capability.

Figure 7:
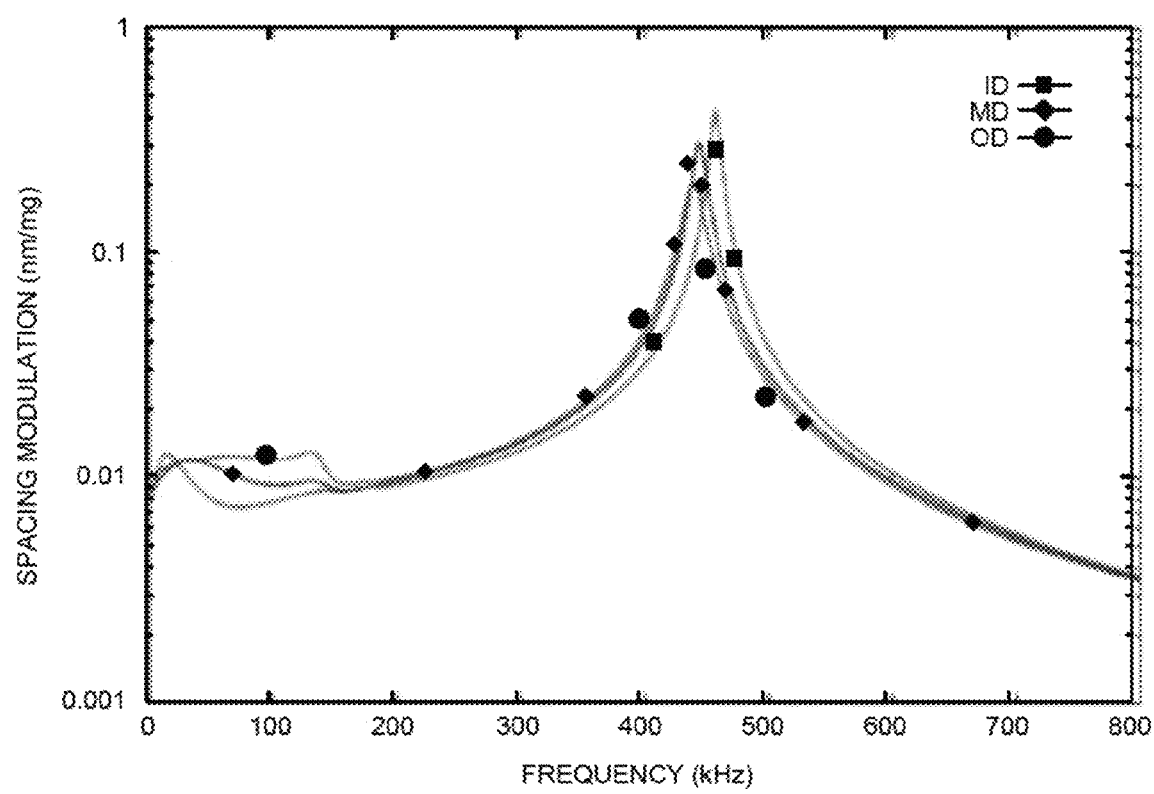
FIG. 7 is a graph showing the ABS resonance behavior according to one embodiment.

FIG. 7 depicts a gap force excitation spectrum, showing the response of an illustrative slider when excited by one milligram of force at the lowest point on the thermal bulge, while normal operating power is being provided to the TFC heater.

As illustrated by the embodiment depicted in the graph of FIG. 7, a small amount of variance may be observed in the touchdown resonance frequency near the outer diameter (OD), middle diameter (MD), and inner diameter (ID) of the disk. Accordingly, it may be desirable to, instead of applying a single frequency, change the frequency slightly based on the position of the slider relative to the disk.

Other approaches may incorporate chirping, small frequency sweeps, etc. during the touchdown scheme to compensate for, and identify the appropriate resonance frequency for that particular magnetic head. These oscillations may be detectable by analyzing modulations in the amplitude and signal strength of a readback signal from a sensor flying over a track of known magnetic pattern, such as a data track written in a single magnetic orientation therealong.

By distinguishing the rises and falls in the readback signal amplitude and/or signal strength, it is possible to correlate these fluctuations with the location of the protrusion in relation to the magnetic medium. Therefore, the ability for the protrusion to actuate at the same frequency as the ABS is naturally resonating allows the two to sync their movements, and maintain a relatively constant clearance between portions of the ABS and the magnetic medium. The device's thermal protrusion compensates for the resonance frequency, achieving a much lower clearance between the ABS and the magnetic medium than previously possible.

Without wishing to be bound by any theory, it is believed that even if the frequency of the thermal protrusion is synchronized with the resonance frequency of the magnetic head, the thermal protrusion may have a higher frequency while flying. This is because, as the NFT, possibly aided by the TFC heater, brings the ABS closer to the magnetic medium, the air bearing actually stiffens, thereby increasing the resonance frequency. Accordingly, the thermal protrusion frequency may be selectively increased to match the resonance frequency as well. Thus, as explained above, it may be advantageous to have a range of possible operating frequencies for the device to compensate for fly height variations.

It is easy to excite frequencies within the resonant frequency range with very small external forces, e.g. by causing the device to touch the magnetic medium, because of the poor damping of the ABS oscillations. Additionally, resonance frequencies are usually low energy, therefore usually only requiring a low level of energy to cause the excitation. However, it is preferred that the excitations due to contact are kept to a minimum while the head is flying to ensure a smooth flight and prevent any unnecessary wear and/or damage to the overall system.

In one approach, a magnetic head may incorporate a sensor for detecting a magnetic field of the magnetic medium. In yet another approach, the slider may include a sensor. According to various approaches, the sensor may include a reader sensor, a pressure sensor, etc. or any other type of sensor which would be obvious to one skilled in the art upon reading the present description.

Because the excitation of the slider is so sensitive to contact with the magnetic medium, the frequency at which contacts occur can easily be measured with the readback signal of the sensor. Detection of amplitude modulation of the readback signal is an accurate indication of contact between the magnetic head and the magnetic medium. Thus, the system can be used as a touchdown sensor.

In one illustrative embodiment, a magnetic data storage system may incorporate a controller (e.g., of a type known in the art). Thus, in one approach, the controller may be configured to detect the oscillation in a flying height of the slider relative to the medium by analyzing the readback signal from a sensor which may be included in the magnetic data storage system. In another approach, the controller may be electrically coupled to the device for controlling operation of the device.

In one embodiment, a method may include causing a device, according to any of the embodiments described herein, to selectively contact the magnetic medium at the frequency of between about 200 kHz and about 600 kHz, but may be higher or lower based on the desired embodiment. In one approach, this method may induce an oscillation in a flying height of the slider relative to the medium which may be within about the same frequency range, or may not, depending on the embodiment.

The embodiments described herein provide an improved touchdown scheme which allows increased accuracy and versatility for data storage systems. Moreover, depending on the specific embodiment, the desired thermal protrusion values from a device may be recorded and a relationship between the device's thermal protrusion and heat source may be achieved. Similarly, many other applications and/or calculations may be possible by incorporating the any of the embodiments described and/or suggested herein.

It should be noted that methodology presented herein for at least some of the various embodiments may be implemented, in whole or in part, in computer hardware, software, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a slider having a media-facing surface; and
   a device coupled to the slider and being selectively extendible for selectively contacting a magnetic medium at a frequency of between about 200 and about 600 kHz;
   wherein the device is configured to expand and contract at the frequency upon being repeatedly heated and cooled for inducing the contacting of the magnetic medium at the frequency;
   wherein the device has a time constant of thermal protrusion of less than about 0.4 microsecond for a protrusion of 1 nm.

2. The magnetic head as recited in claim 1, wherein the device is a near field transducer.

3. The magnetic head as recited in claim 1, further comprising a heater for inducing thermal protrusion of the media-facing surface in a vicinity of the device, the thermal protrusion moving the device towards the magnetic medium.

4. The magnetic head as recited in claim 1, wherein the selective contacting at the frequency induces an oscillation in a flying height of the slider relative to the medium, wherein the slider is designed to fly above the magnetic medium on an air bearing during write operations.

5. The magnetic head as recited in claim 4, further comprising a sensor for detecting a magnetic field of the magnetic medium, the oscillation being detectable by analysis of a readback signal from the sensor.

6. An apparatus, comprising:
the magnetic head as recited in claim 1; and
a controller configured to cause the device to selectively contact the magnetic medium repeatedly at the frequency.

7. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

8. The system as recited in claim 7, wherein the controller is configured to detect an oscillation in a flying height of the slider relative to the medium by analyzing a readback signal from a sensor of the slider.

9. A magnetic data storage system, comprising:
a slider having a media-facing surface;
a magnetic medium;
a device coupled to the slider and being selectively extendible for selectively and repeatedly contacting the magnetic medium for inducing and maintaining an oscillation in a flying height of the slider relative to the medium;
a drive mechanism for passing the magnetic medium over the at least one slider; and
a controller electrically coupled to the device for controlling operation of the device;
wherein the device is configured to expand and contract at a frequency upon being repeatedly heated and cooled for inducing the repeated contacting of the magnetic medium at the frequency;
wherein the device has a time constant of thermal protrusion of less than about 0.4 microsecond for a protrusion of 1 nm.

10. The system as recited in claim 9, wherein the device is a near field transducer.

11. The system as recited in claim 9, further comprising a heater for inducing thermal protrusion of the media-facing surface in a vicinity of the device, the thermal protrusion moving the device towards the magnetic medium.

12. The system as recited in claim 9, wherein the oscillation induced by the contacting is at a frequency of between about 200 and about 600 kHz.

13. The system as recited in claim 9, wherein the slider includes a sensor for detecting a magnetic field of the magnetic medium, the oscillation being detectable by analysis of a readback signal from the sensor.

14. The system as recited in claim 13, wherein the controller is configured to detect the oscillation in a flying height of the slider relative to the medium by analyzing the readback signal from the sensor.

15. The system as recited in claim 9, wherein the slider is designed to fly above the magnetic medium on an air bearing during write operations.

* * * * *